(12) United States Patent
Chilmulwar et al.

(10) Patent No.: US 10,628,018 B2
(45) Date of Patent: Apr. 21, 2020

(54) METHOD AND USER INTERFACE (UI) FOR CUSTOMIZED USER ACCESS TO APPLICATION FUNCTIONALITIES

(71) Applicant: Samsung Electronics Co., Ltd., Suwon-si, Gyeonggi-do (KR)

(72) Inventors: Avinash Sudhakar Chilmulwar, Bangalore (IN); Mayank Gupta, Bangalore (IN); Vinay Singh, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 245 days.

(21) Appl. No.: 15/222,482

(22) Filed: Jul. 28, 2016

(65) Prior Publication Data

US 2017/0031581 A1 Feb. 2, 2017

(30) Foreign Application Priority Data

Jul. 28, 2015 (IN) .............. 3873/CHE/2015
Jul. 18, 2016 (IN) .............. 3873/CHE/2015

(51) Int. Cl.
*G06F 3/0484* (2013.01)
*G06F 3/0481* (2013.01)
*G06F 3/0482* (2013.01)
*G06F 3/0486* (2013.01)
*G06F 3/0488* (2013.01)
*G06Q 50/00* (2012.01)

(52) U.S. Cl.
CPC ........ *G06F 3/04847* (2013.01); *G06F 3/0482* (2013.01); *G06F 3/0486* (2013.01); *G06F 3/04817* (2013.01); *G06F 3/04883* (2013.01); *G06Q 50/01* (2013.01); *G06F 2203/04806* (2013.01); *G06F 2203/04808* (2013.01)

(58) Field of Classification Search
CPC ............ G06F 3/04847; G06F 3/04817; G06F 3/0486; G06F 3/0482; G06F 3/04883; G06F 2203/04808; G06F 2203/04806; G06Q 50/01
See application file for complete search history.

(56) References Cited

U.S. PATENT DOCUMENTS 5,140,677 A * 8/1992 Fleming ................ G06F 3/0481
715/784
5,140,678 A * 8/1992 Torres .................. G06F 3/0481
715/776

(Continued)

FOREIGN PATENT DOCUMENTS

KR 10-1387507 B1 4/2014
KR 10-2014-0118663 A 10/2014

*Primary Examiner* — Nicholas Klicos
(74) *Attorney, Agent, or Firm* — Jefferson IP Law, LLP

(57) ABSTRACT

A method and a device for direct launching of an interface to selected functionalities of an application are provided. The method includes receiving a user input gesture on an application icon, displaying a plurality of user interface (UI) elements on the application icon, in response to the received user input gesture, wherein each of the plurality of UI elements corresponds to at least one functionality of an application, receiving a user selection of at least one UI element of the plurality of UI elements, and launching the functionality corresponding to the selected UI element.

11 Claims, 18 Drawing Sheets

(56) References Cited

U.S. PATENT DOCUMENTS

| | | | | |
|---|---|---|---|---|
| 7,603,629 B1* | 10/2009 | Crosswhite | G06Q 30/02 | 715/772 |
| 2004/0150668 A1* | 8/2004 | Myers | G06F 3/0421 | 715/771 |
| 2004/0212617 A1* | 10/2004 | Fitzmaurice | G06F 3/0481 | 345/440 |
| 2004/0221243 A1* | 11/2004 | Twerdahl | G06F 3/016 | 715/834 |
| 2005/0005249 A1* | 1/2005 | Hill | G06F 3/0481 | 715/810 |
| 2005/0039141 A1* | 2/2005 | Burke | G06F 3/0482 | 715/810 |
| 2005/0177796 A1* | 8/2005 | Takahashi | G06F 3/0486 | 715/769 |
| 2006/0064648 A1* | 3/2006 | Makela | G06F 3/0482 | 715/808 |
| 2009/0019385 A1* | 1/2009 | Khatib | G06F 9/451 | 715/765 |
| 2009/0235200 A1* | 9/2009 | Deutsch | G06F 9/451 | 715/783 |
| 2009/0327955 A1* | 12/2009 | Mouilleseaux | G06F 3/04812 | 715/810 |
| 2010/0058182 A1* | 3/2010 | Jung | G06F 3/04817 | 715/702 |
| 2010/0100849 A1 | 4/2010 | Fram | | |
| 2010/0115450 A1* | 5/2010 | Scott | G06F 3/0483 | 715/777 |
| 2010/0122194 A1* | 5/2010 | Rogers | G06F 3/04817 | 715/769 |
| 2010/0138763 A1* | 6/2010 | Kim | G06F 1/1626 | 715/765 |
| 2010/0205559 A1* | 8/2010 | Rose | G06F 3/04817 | 715/781 |
| 2010/0299637 A1* | 11/2010 | Chmielewski | G06F 3/0482 | 715/834 |
| 2011/0035691 A1* | 2/2011 | Kim | G06F 3/04817 | 715/765 |
| 2011/0061012 A1* | 3/2011 | Lim | G06F 3/04817 | 715/769 |
| 2011/0066976 A1* | 3/2011 | Hwang | G06F 3/04883 | 715/810 |
| 2012/0092346 A1* | 4/2012 | Ording | G06F 3/0481 | 345/473 |
| 2012/0159387 A1* | 6/2012 | Oh | G06F 3/04817 | 715/808 |
| 2013/0061172 A1* | 3/2013 | Huang | G06F 3/04817 | 715/808 |
| 2013/0132906 A1* | 5/2013 | Siurumaa | G06F 3/04817 | 715/835 |
| 2013/0167090 A1* | 6/2013 | Tomizu | G06F 3/0482 | 715/835 |
| 2013/0191767 A1* | 7/2013 | Peters | G06F 3/0481 | 715/765 |
| 2013/0219341 A1 | 8/2013 | Lee et al. | | |
| 2014/0068516 A1* | 3/2014 | Escobedo | G06F 3/04817 | 715/835 |
| 2014/0149908 A1* | 5/2014 | Jeon | G06F 3/04886 | 715/769 |
| 2014/0292649 A1 | 10/2014 | Bae et al. | | |
| 2014/0298226 A1 | 10/2014 | Jin et al. | | |
| 2014/0298248 A1 | 10/2014 | Kang et al. | | |
| 2014/0298249 A1 | 10/2014 | Lee et al. | | |
| 2014/0298253 A1 | 10/2014 | Jin et al. | | |
| 2014/0298268 A1 | 10/2014 | Kang et al. | | |
| 2014/0298478 A1 | 10/2014 | Kim et al. | | |
| 2015/0007016 A1 | 1/2015 | Lee et al. | | |
| 2015/0082182 A1 | 3/2015 | Lim | | |
| 2016/0034153 A1* | 2/2016 | Lejeune | G06F 3/04847 | 715/765 |

* cited by examiner

1011

METHOD AND USER INTERFACE (UI) FOR CUSTOMIZED USER ACCESS TO APPLICATION FUNCTIONALITIES

CROSS-REFERENCE TO RELATED APPLICATION(S)

This application claims the benefit under 35 U.S.C. § 119(a) of an Indian provisional patent application filed on Jul. 28, 2015 in the Indian Intellectual Property Office and assigned Serial number 3873/CHE/2015, and of an Indian regular patent application filed on Jul. 18, 2016 in the Indian Intellectual Property Office and assigned Serial number 3873/CHE/2015, the entire disclosure of each of which is hereby incorporated by reference.

TECHNICAL FIELD

The present disclosure relates to electronic devices. More particularly, the present disclosure relates to provide customized user access to application functions in the electronic devices.

BACKGROUND

'Smart' communication devices support different types of applications, and with the increasing popularity of smartphones, tablet computers, and so on, multiple applications can serve the same purpose. Further, each application can have multiple functionalities. One main factor/parameter that a user would consider in addition to a technical specification of a device is the ease with which the user can interact with the device to perform various functions.

Most of the devices that are currently available allow customization to improve a user interface (UI). However, the existing devices provide one interface in the display screen and require the user to launch the main application to navigate further through the different functionalities of the application. This sequence of first launching the application demands more effort and time, uses system resources such as memory, and may not be convenient for the user.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide customization of application interface to provide direct access to functionalities of an application through an application icon without launching a full-fledged application.

Another aspect of the present disclosure is to provide option to merge user interface (UI) elements corresponding to selected functionalities of an application to launch one or more desired functionalities of an application.

Another aspect of the present disclosure is to provide options for adding/removing/merging different UI elements from single or multiple applications to create customized application.

Another aspect of the present disclosure is to provide option(s) for closing one or more functionality of from an application icon to create customized application.

Another aspect of the present disclosure is to provide option for creating an application icon using UI elements corresponding to functionalities of different applications.

Another aspect of the present disclosure is to provide option for arranging an order in which UI elements are displayed in the application icon.

Another aspect of the present disclosure is to provide option for creating nested application icon.

Another aspect of the present disclosure is to provide option for sharing an application icon across different devices.

Another aspect of the present disclosure is to provide option for creating the customized application using finger-pinch and/or tapping inputs on one or more application.

In accordance with an aspect of the present disclosure, a method of launching an application in a device is provided. The method includes receiving a user input gesture on an application icon, displaying a plurality of UI elements in the application icon in response to the received user input gesture, wherein each of the plurality of UI elements corresponds to different functionalities of the application, receiving a user selection of at least one UI element of the plurality of UI elements, and launching the functionality corresponding to the selected UI element.

A few examples of the input gestures include zoom, tap, pinch to zoom, and so on, and each of such input gestures can be configured to trigger certain actions as pre-configured.

In accordance with another aspect of the present disclosure, a device is provided. The device includes a hardware processor and a non-transitory memory storing instructions. The instructions are configured to cause the hardware processor to control for receiving a user input gesture on an application icon in the device, by an input/output (I/O) interface of the device, causing to display, by a customization module of the device, a plurality of UI elements on the application icon, in response to the received user input gesture, wherein each of the plurality of UI elements corresponds to a functionality of an application, receiving a user selection of at least one UI element from the plurality of UI elements, by the I/O interface, and launching the functionality of the application corresponding to the selected UI element, by the customization module.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
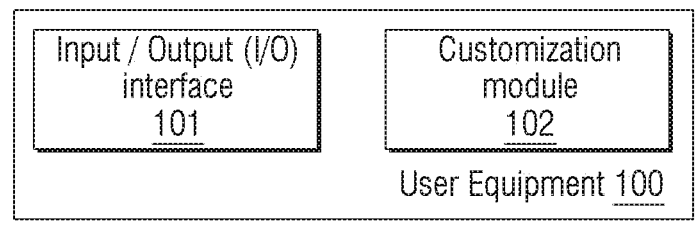
FIG. 1 illustrates a block diagram of the user equipment (UE) that provides customized access to application functionalities according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The various embodiments herein disclose a mechanism for providing customized access to functionalities of application(s) in user equipment (UE). Referring now to the drawings, and more particularly to FIGS. 1, 3A, 3B, 4, 5A, 5B, 6, 7A, 7B, 7C, 7D, and 8A, 8B, 8C, 8D, 8E, and 8F, where similar reference characters denote corresponding features consistently throughout the figures, there are shown various embodiments.

FIG. 1 illustrates a block diagram of the UE that provides customized access to application functionalities according to an embodiment of the present disclosure.

Referring to FIG. 1, the UE 100 comprises an input/output (I/O) interface 101 and a customization module 102. The UE 100 can be any electronic device such as, but not limited to, a smartphone, tablet computer, and laptop, that can host different applications, and which preferably has a touch interface or any such interface to allow user interaction in at least one specified format.

The I/O interface 101 can be configured to provide at least one interface for the user to interact with and provide inputs to the UE 100. For example, the interface can be a touch screen interface that allows the user to provide touch inputs to the UE 100. The I/O interface 101 can be further configured to provide the collected input(s) to the customization module 102.

The customization module 102 can be configured to process the input(s) received from the I/O interface 101 and identify the application icon which is being accessed by the user. Here, the term 'application icon' can refer to icon of any application installed in the UE 100 which further includes one or more user interface (UI) element, wherein the UI elements correspond to different functionalities of the application. The terms 'UI' and 'UI element' are used interchangeably, throughout the present description. The 'application icon' can also refer to a customized interface which includes at least one selected UI element of at least one application. The customization module 102 can be further configured to provide suitable interface(s) to allow the user to select at least one UI element among the UI elements present in the selected application icon. Being able to access UI elements corresponding to different functionalities of the application directly, the user can directly access any selected functionality without having to launch the full application. In an embodiment, the UI elements on an application can be displayed at various levels, which can be accessed by the user by providing suitable inputs. This is depicted in FIGS. 8A to 8F.

FIGS. 8A, 8B, 8C, 8D, 8E, and 8F depict example implementations of accommodating UI elements on an application icon and accessing the same according to various embodiments of the present disclosure.

Figure 8A:
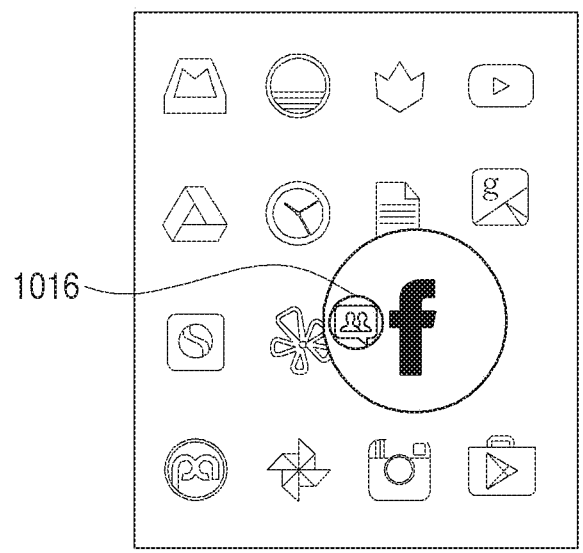
FIGS. 8A, 8B, 8C, 8D, 8E, and 8F depict example implementations of accommodating UI elements on an application icon and accessing the same according to various embodiments of the present disclosure.

Referring to FIG. 8A, the user accesses an application icon, for example, a Facebook application icon, on the main screen of the device by providing a zoom input. At a first level zoom, only the UI element pertaining to a 'Friend list' functionality (1016) of Facebook might be displayed to the user. Herein, the zoom input may be an input according to an operation, while touching the application icon with two fingers, to spread out the touched point, e.g. a 'pinch-out' operation.

Figure 8B:
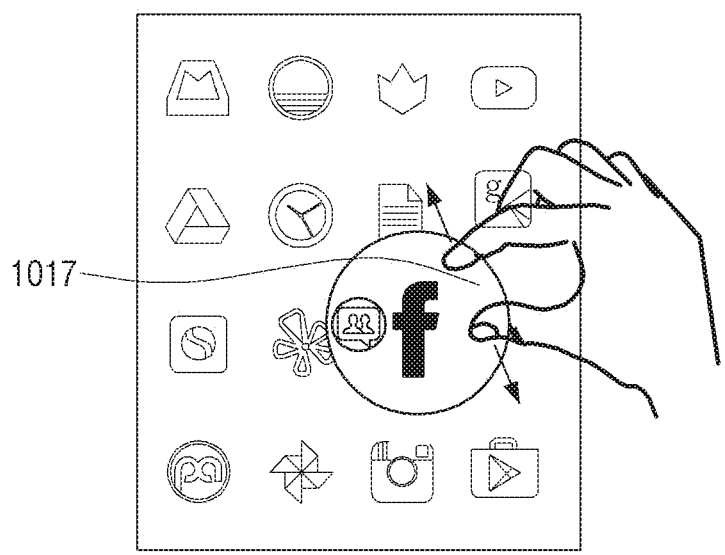
Figure 8C:
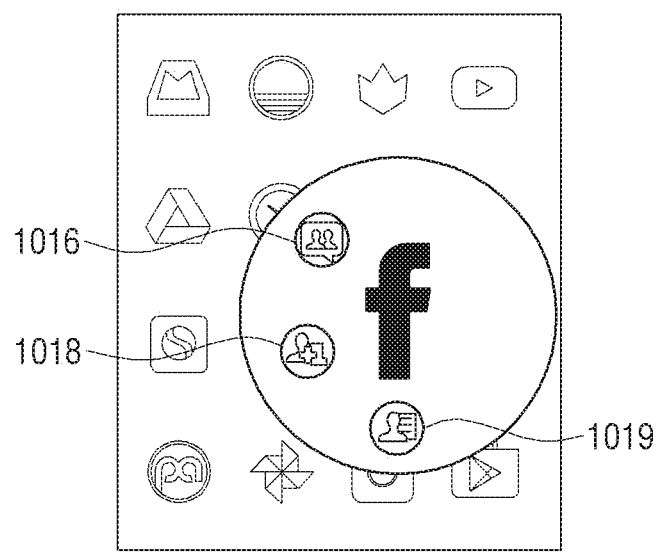
Figure 8D:
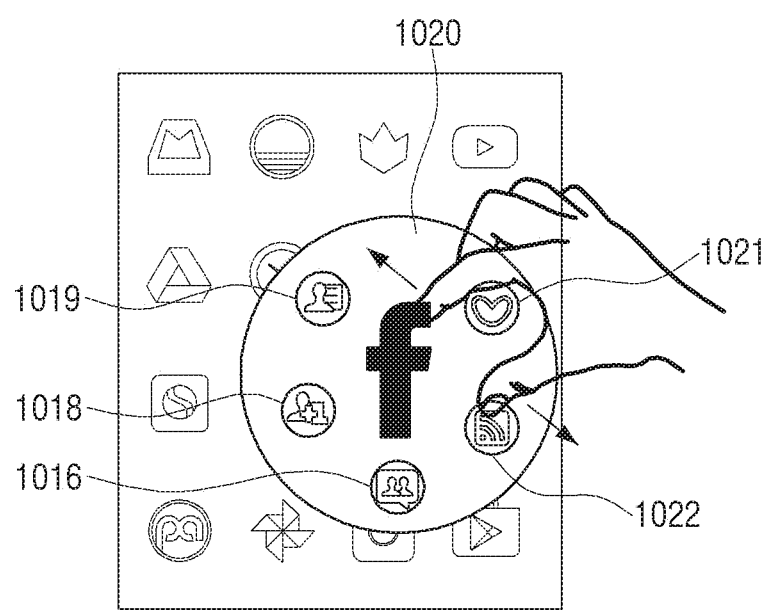

Referring to FIG. 8B, the user zooms further (1017), and in the second level as depicted in FIG. 8C, displays UIs corresponding to 'Friend requests (1018)' and 'Chat list (1019)' along with that of 'Friend list'. When the user zooms further as depicted in FIG. 8D, in a third level (1020), the application icon displays UI elements corresponding to 'Feed (1022)' and 'Likes (1021)' in addition to the UI elements displayed in second level. The user can then access (1023) any of the UI elements by providing a suitable input (in this example, a 'tap'), as depicted in FIG. 8E.

Herein, an expanded application icon of each of the first level, the second and the third level can be determined according to a distance of the operation to spread out the touched point of zoom input.

Figure 8E:
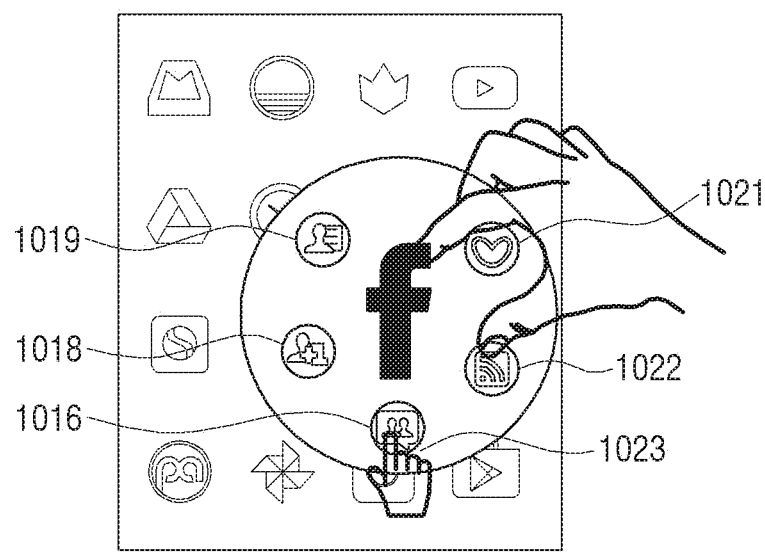
Figure 8F:
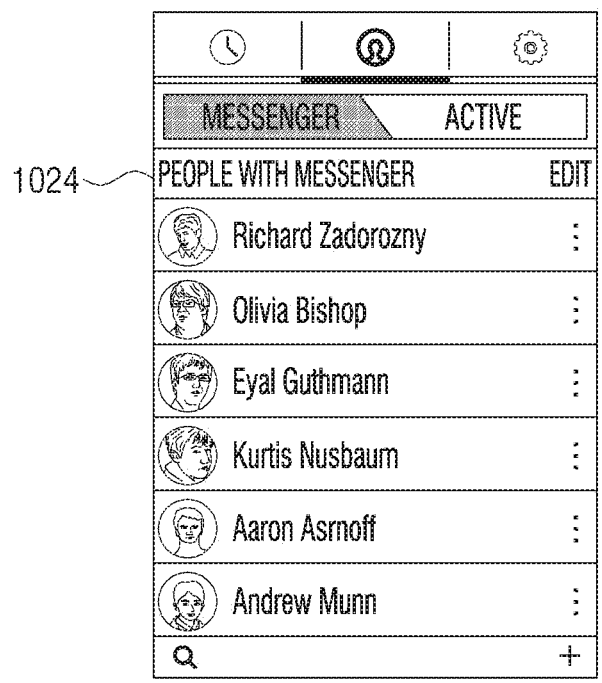

Referring to FIG. 8E, the user might access the chat functionality, which is then launched in an application tab (as in 1024 of FIG. 8F).

When releasing a touch while the expanded application icon in one level is displayed, an application icon can be displayed again. For example, while the expanded application icon of the first level and the UI element pertaining to 'Friend list' functionality (1016) of Facebook are displayed, when a touch is released, the UI element may disappear, and the Facebook application icon can be displayed again.

The embodiment is not limited thereto, and even if a touch is released, the first level zoom can be maintained. In this case, a level can change through additional zoom input with respect to the expanded application icon in the first level.

The level can be determined according to a number of touches instead of zoom input. For example, when an application icon is touched once, an application may be executed, and when an application icon is touched twice consecutively (i.e. a 'double tap'), an expanded application icon of the first level can be displayed.

A level can change according to touch duration. For example, when an application icon is touched within a first predetermined time, the corresponding application can be executed, and when the touch on the application icon exceeds the first predetermined time and is touched within a second predetermined time, the expanded application icon in the first level can be displayed.

In an embodiment, the customization module 102 provides option(s) for allowing a user to define/customize the UIs that need to be displayed in an application icon pertaining to each application. The customization module 102 can allow the user to add and/or remove and/or merge UIs pertaining to different functionalities of an application, from the application icon.

The customization module 102 can be further configured to allow the user to select UIs that correspond to selected functionalities of different applications and merge them to form a customized application icon. For example, the user may drag and drop a selected UI of one application to a selected UI of another application, and the customization module 102 automatically creates an application icon with the selected UI s.

For example, a user may drag and drop the first UI element of the expanded application icon of the Facebook application icon to outside the expanded application icon. That is, the first UI element can be displayed along with other application icons. In addition, a user can drag and drop the second UI element of the expanded icon of the Twitter application icon to outside the expanded Twitter icon. In particular, when a location of drop is the first UI element, the first UI element and the second UI element can constitute one icon. As the zoom input for the newly constituted icon, an expanded icon including the first UI element and the second UI element can be displayed.

Figure 3A:
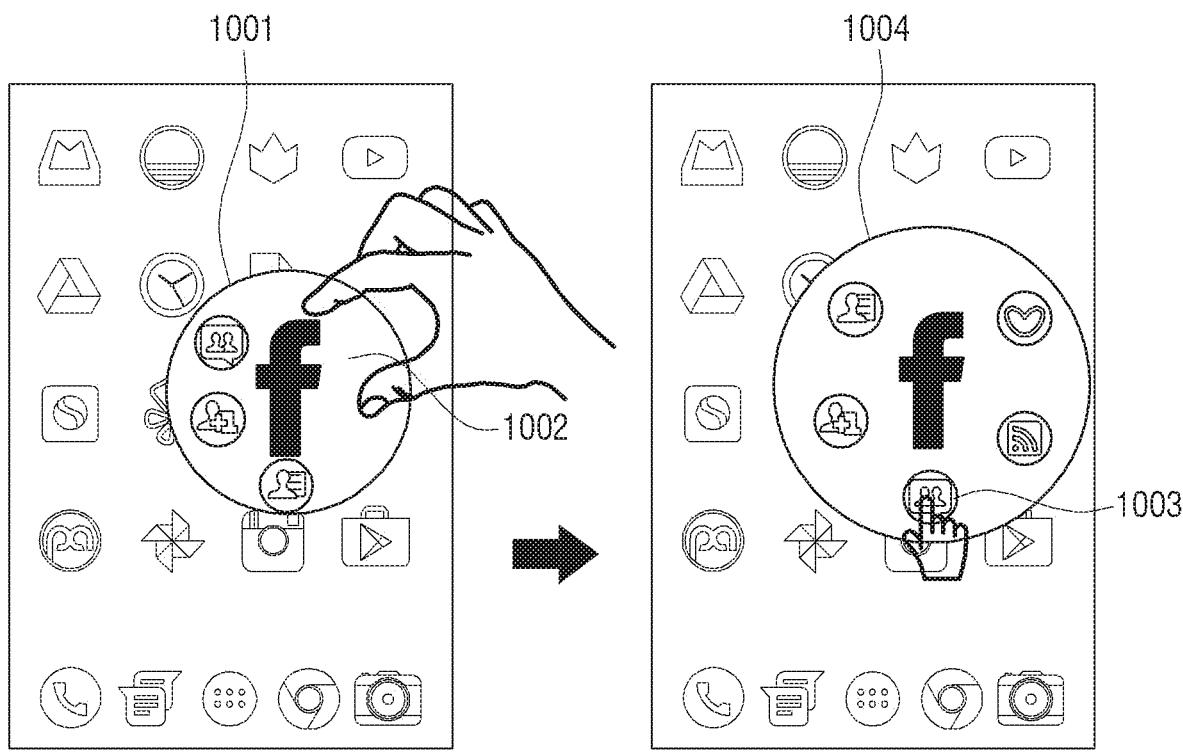
FIGS. 3A and 3B depict example implementations of the customized access to application functionalities according to various embodiments of the present disclosure.
Figure 3A:
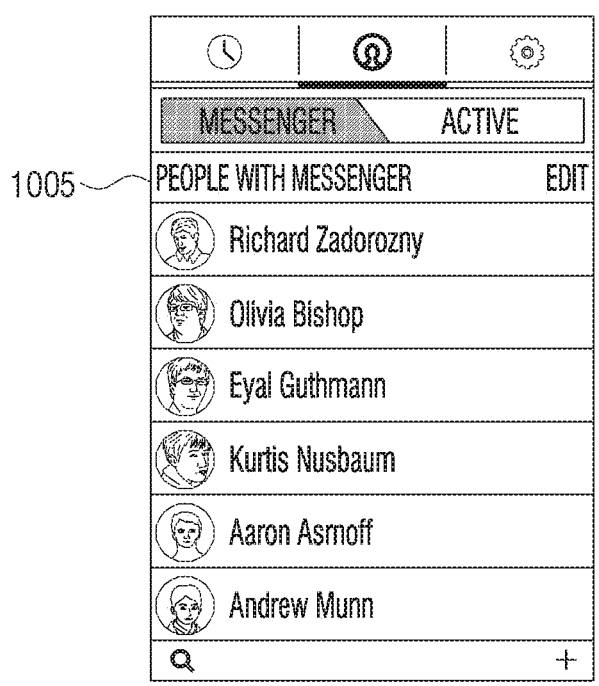
Figure 3B:
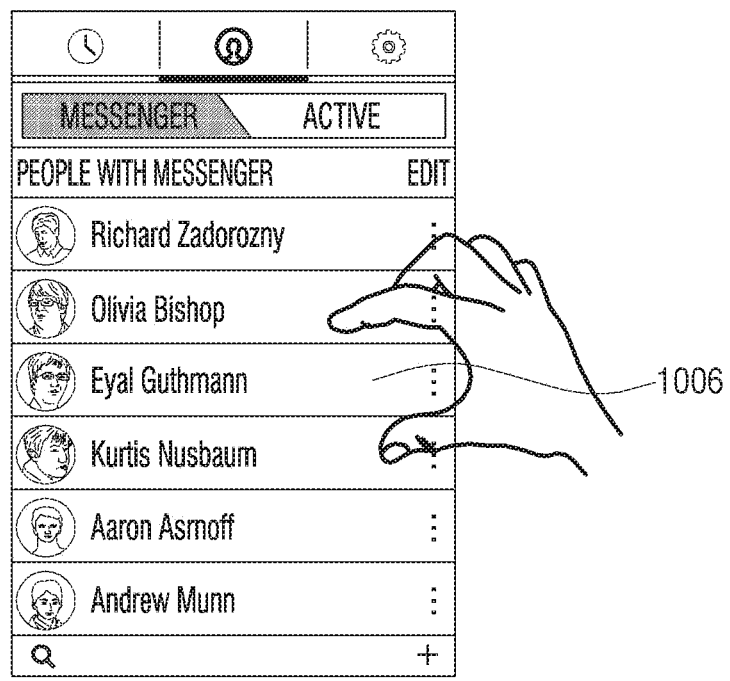

FIGS. 3A and 3B depict example implementations of the customized access to application functionalities according to various embodiments of the present disclosure.

Upon receiving a user input pertaining to selection of a UI from the application icon, the customization module 102 displays the functionality corresponding to the selected UI using a suitable interface. For example, refer to FIGS. 3A and 3B. In this example, an application icon (1001) is created for the Facebook application installed in the UE 100. When the user accesses (1002) the Facebook icon in a pre-defined manner (in this example pinch-to-zoom input), the UI icons corresponding to various functionalities of Facebook are displayed (1004) in the application icon to the user. Further, if the user selects (1003) the messenger icon, For example, upon receiving this user selection the messenger is directly launched (1005) as shown in FIG. 3A. Further, the user is provided with options to select (1006) at least one contact from the contact list and initiate a communication session as depicted in FIG. 3B. This is done without launching the full Facebook application.

Figure 4:
FIG. 4 depicts an example implementation of creating an application icon using functionalities of different applications according to an embodiment of the present disclosure.

FIG. 4 depicts an example implementation of creating an application icon using functionalities of different applications according to an embodiment of the present disclosure.

Referring to FIG. 4, an application icon created by merging selected functionalities of different applications is depicted. In this example, the user selects the Facebook messenger functionality and merges it with a WhatsApp chat feature. Upon receiving a user input pertaining to selection and merging of the two functionalities, the customization module 102 automatically generates a customized application icon and adds the selected features to the application icon. Further when the user accesses the customized application icon, the functionalities represented by the UIs in the customized application icon are displayed in a single window or different windows, to the user. In this example, the Facebook messenger (1008) and WhatsApp chat (1007) features are displayed side by side as in FIG. 4. The user may also create a customized application icon by selecting two or more UI elements from at least two other application icons. For example, the user can select two UI elements from two application icons using a tap/pinch gesture, and create the customized application window using the selected UI elements. The user can also close/remove selected UI element(s) from an application icon, by performing corresponding gesture as pre-configured.

For example, while the Facebook messenger (1008) and WhatsApp chat (1007) features are displayed side by side as in FIG. 4, when there is an input according to an operation to reduce the touched point while two fingers are touched, an expanded application icon which includes a UI element indicating each of the Facebook messenger (1008) and WhatsApp chat (1007) can be overlapped and displayed. In this case, a user may remove one UI element and release or undo the grouping.

Figure 5A:
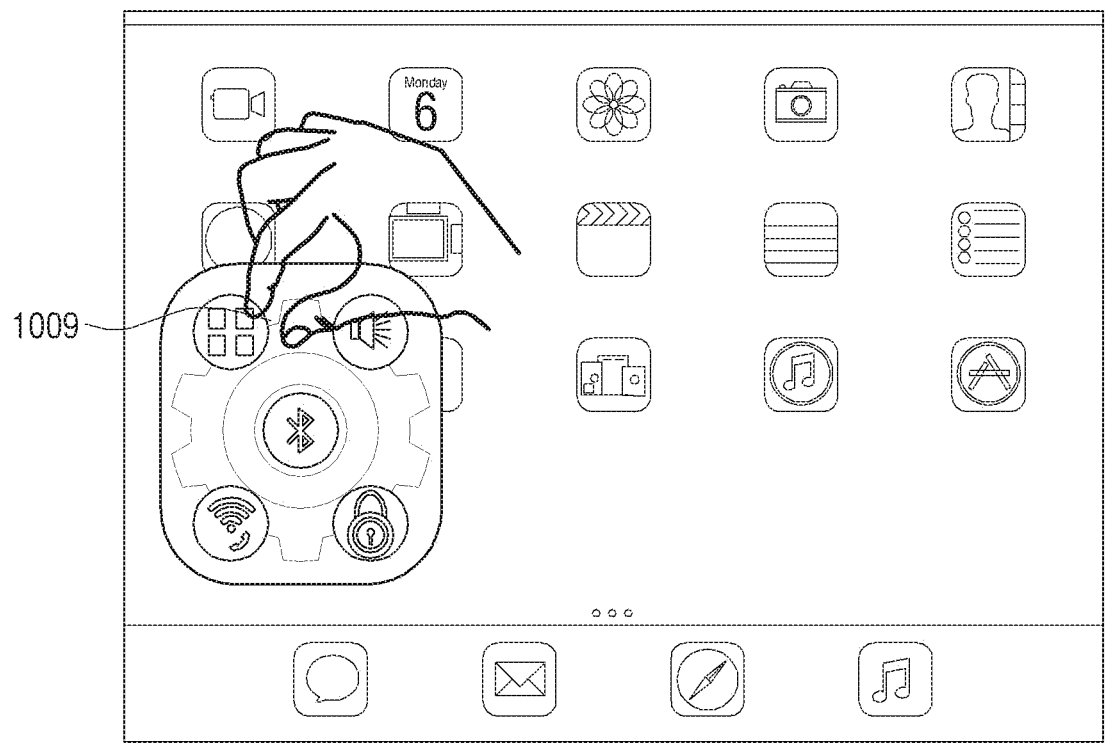
FIGS. 5A and 5B depict example implementations of creating a nested application icon according to various embodiments of the present disclosure.
Figure 5B:
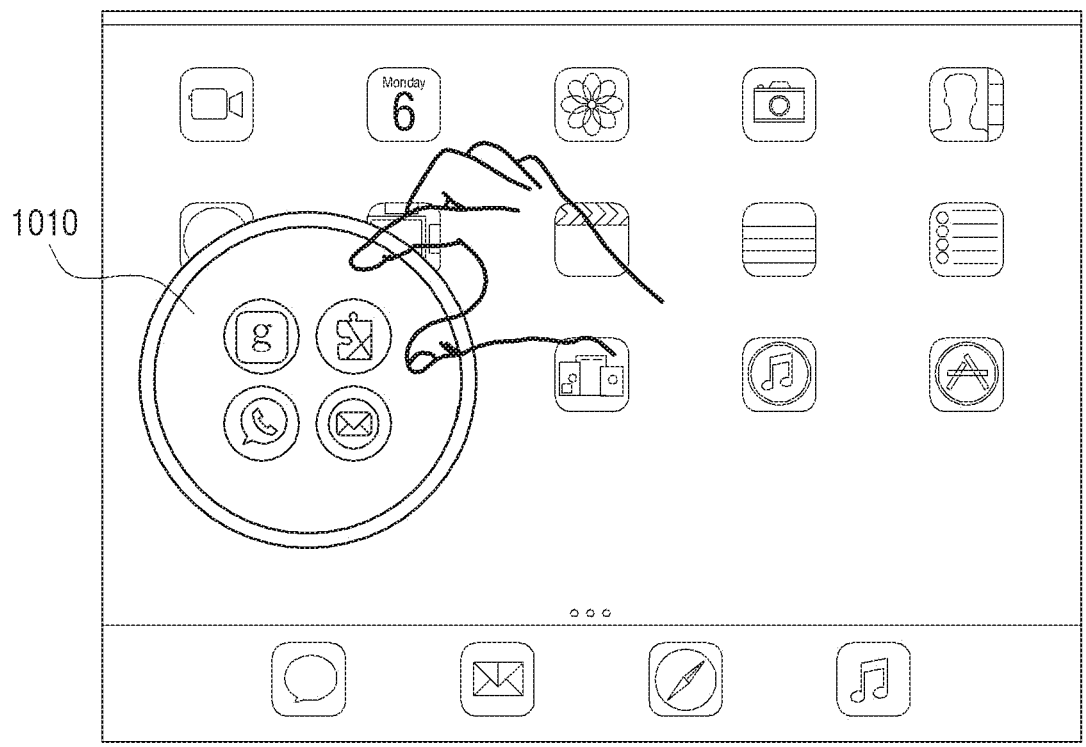

FIGS. 5A and 5B depict example implementations of creating a nested application icon according to various embodiments of the present disclosure.

Referring to FIGS. 5A and 5B, the customization module 102 can be further configured to provide a nested application icon feature. Using a nested application icon option, a user can add one application icon as part of another application icon. Referring to FIG. 5A, the user can, using a suitable gesture, access (1009) the application icon which is included in the other application icon, and then access (1010) the UIs in the nested application icon (referring to FIG. 5B).

Figure 6:
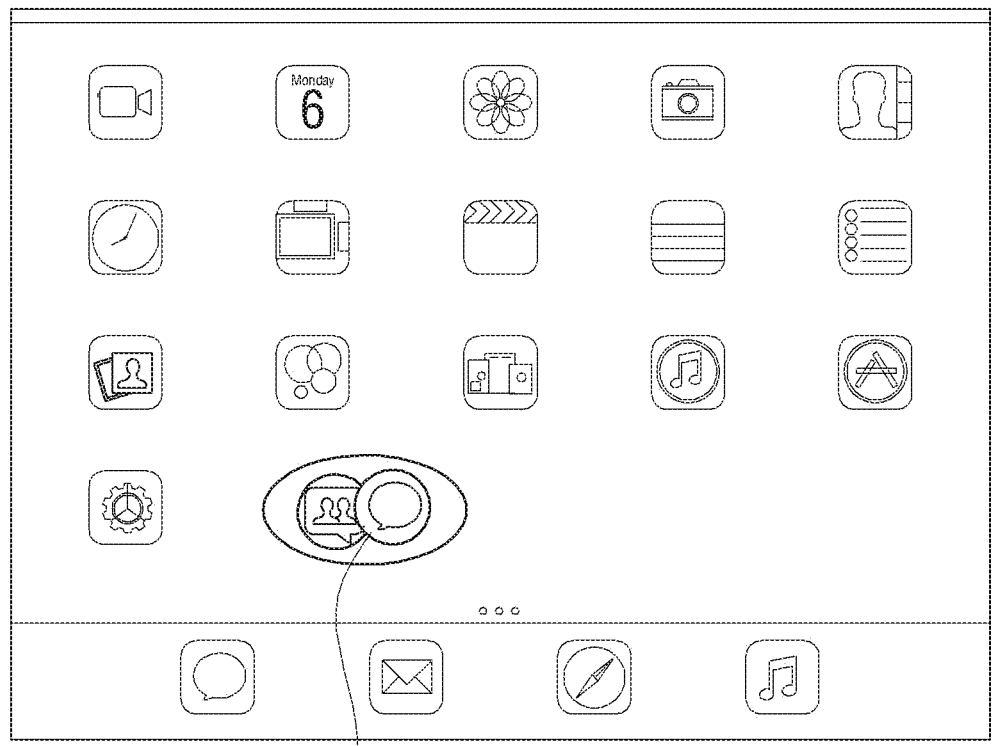
FIG. 6 depicts an example implementation of moving an application icon across devices according to an embodiment of the present disclosure.
Figure 6:
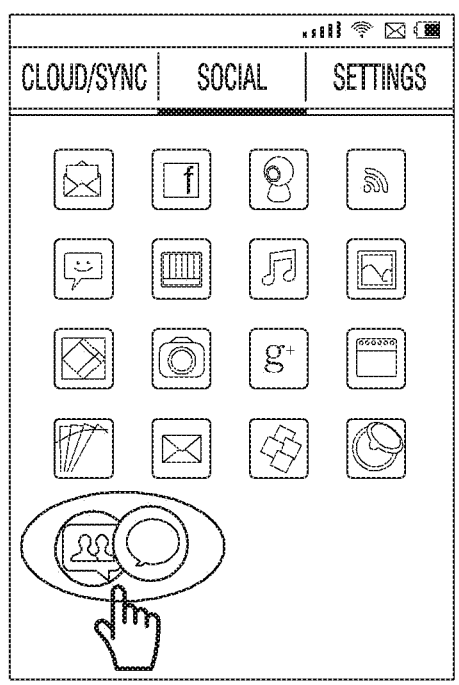
Figure 7A:
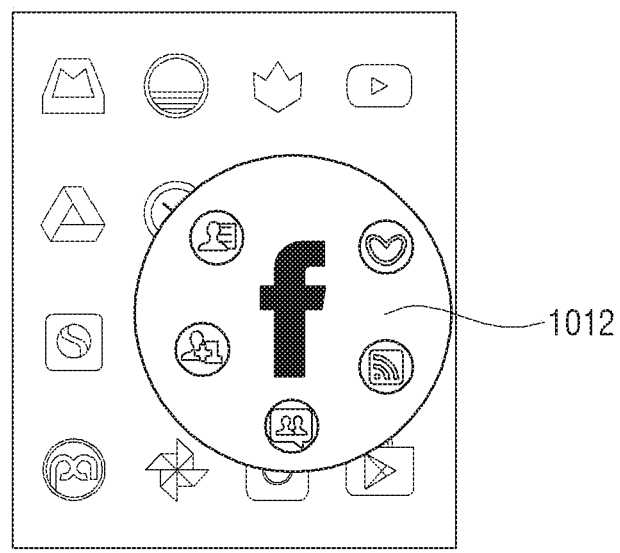
FIGS. 7A, 7B, 7C, and 7D depict example implementations of grouping UI elements on an application icon and accessing the group according to various embodiments of the present disclosure.
Figure 7B:
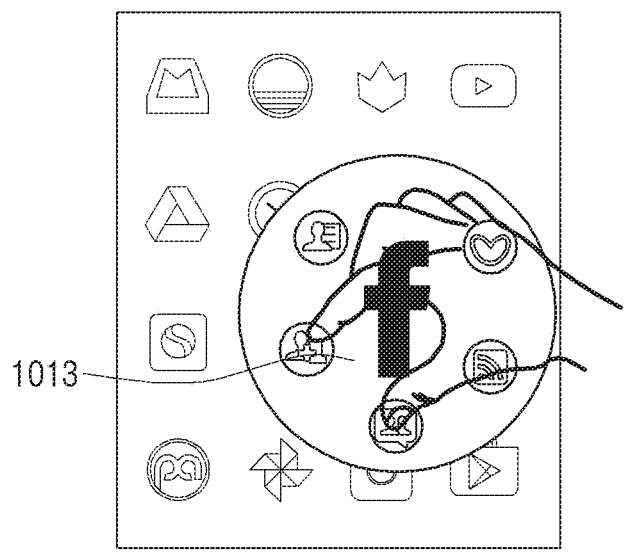
Figure 7C:
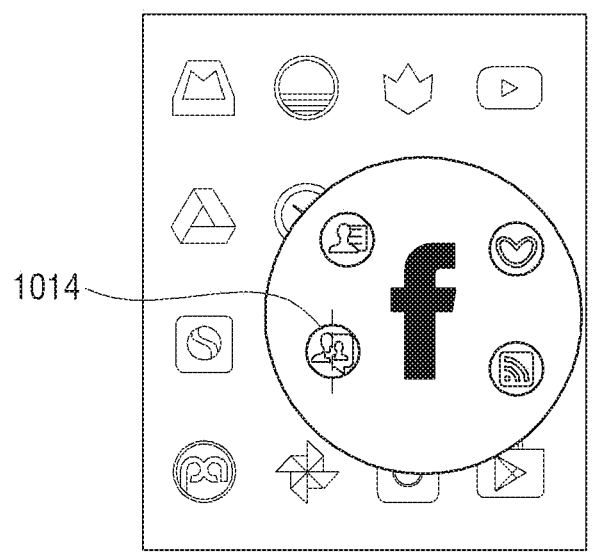
Figure 7D:
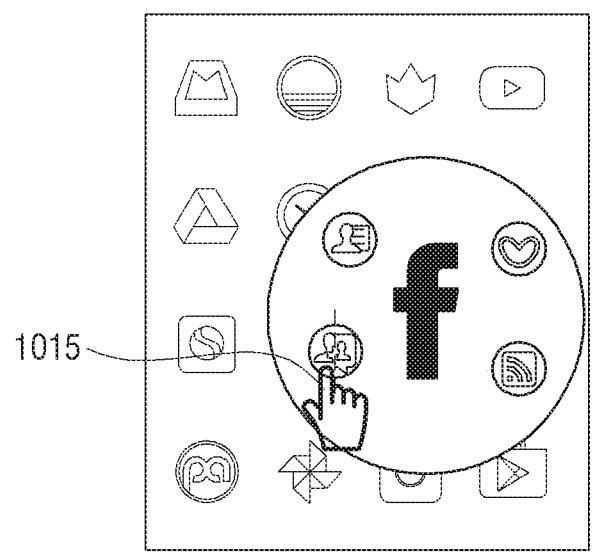

FIG. 6 depicts an example implementation of moving an application icon across devices according to an embodiment of the present disclosure.

Referring to FIG. 6, the customization module 102 can be further configured to provide an option to share an application icon (1011) and associated contents across devices. In an embodiment, 'associated contents' refer to UIs and the corresponding order/structure present in the application icon being moved. Thus, an application icon to which other application icons or functionalities have been added may be shared to another device.

FIGS. 7A, 7B, 7C, and 7D depict example implementation of grouping UI elements on an application icon and accessing the group according to various embodiments of the present disclosure.

Referring to FIGS. 7A to 7D, the customization module 102 can be further configured to allow grouping of selected UI elements within an application icon. When the UI elements of an application icon are visible (as in 1012 of FIG. 7A), the user can perform a pre-defined action (for example, a drag and drop/pinch as in 1013 of FIG. 7B) to trigger selection and grouping of the selected UI elements, and in response the customization module 102 groups the selected UI elements (as in 1014 of FIG. 7C). Here, the selected UI elements are the UI elements corresponding to a friend list and a chat window of the Facebook application, which are then grouped together. Further, when the user accesses (1015) the group by providing an input (as in FIG. 7D), the functionalities corresponding to the UI elements in the group are launched in one or more tabs of an application window by the customization module 102.

The customization module 102 can be further configured to allow removal of one or more UI elements from the application icon and/or a group. To support removal of the UI element(s), the customization module 102 displays all UI elements on an application icon or group being accessed by the user, and provides an option for the user to provide input to remove one or more of the displayed UI elements from the group/application icon. The customization module 102 can be further configured to learn from user actions, preferences of the user in terms of functionalities and application icons being accessed, and accordingly customize the way the UI elements are displayed to the user. For example, consider a Facebook application icon which includes UI elements corresponding to chat, friend list, notifications, feed, and other functionalities of the application. Of all the UI elements, if the user regularly accesses chat and feed, UI elements corresponding to those two functionalities can be highlighted by the customization module 102 later when the user accesses the Facebook application icon.

Figure 2:
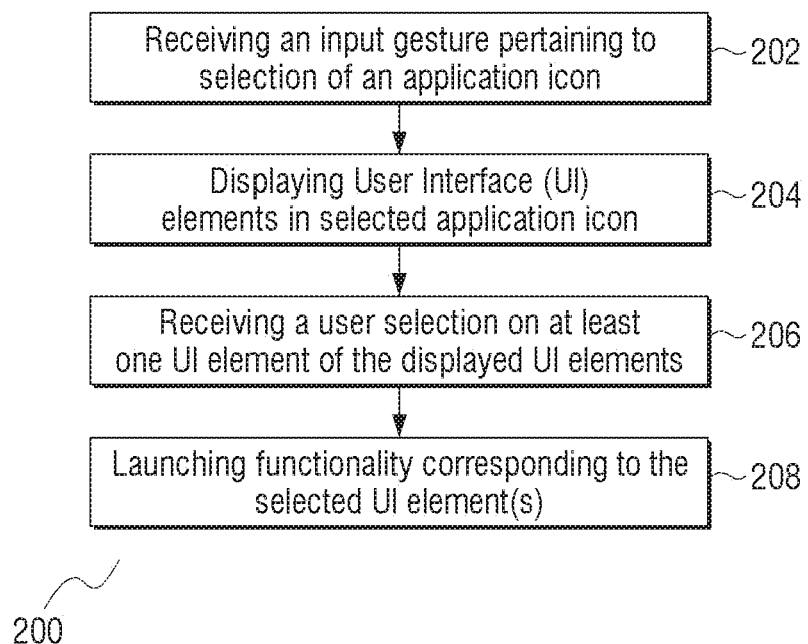
FIG. 2 is a flow diagram that depicts steps involved in the process of providing customized access to application functionalities using the UE according to an embodiment of the present disclosure.

FIG. 2 is a flow diagram that depicts steps involved in the process of providing customized access to application functionalities using the UE according to an embodiment of the present disclosure.

Referring to FIG. 2, The UE 100 receives at operation 202 a user input pertaining to selection of an application icon which includes one or more UIs. Upon receiving an appropriate (i.e. pre-configured) user gesture input, the UE 100 displays at operation 204 the UI(s) present in the application to the user. The user can, using a suitable interface provided, make a selection of at least one UI in the application icon at operation 206. Upon receiving the user selection, a functionality of at least one application corresponding to the selected UI is launched by the UE 100 at operation 208. The various actions in method 200 may be performed in the order presented, in a different order, or simultaneously. Further, in some embodiments, some actions listed in FIG. 2 may be omitted.

The various embodiments disclosed herein can be implemented through at least one software program running on at least one hardware device and performing network management functions to control the network elements. The network elements shown in FIG. 1 include blocks which can be at least one of a hardware device, or a combination of hardware device and software module.

The various embodiments disclosed herein specify a mechanism for launching an application in a UE. The mechanism allows customization of interfaces to allow direct launching of an interface to selected functionalities of the application, providing a system thereof. Therefore, it is understood that the present disclosure is extended to such a system and by extension, to a computer readable storage medium having a message therein, said computer readable storage medium containing a program code for implementation of one or more steps of the method, when the program runs on a computer such as a server, mobile device, or any suitable programmable device. The method may be implemented in a preferred embodiment using the system together with a software program written in, for example, very high speed integrated circuit hardware description language (VHDL), another programming language, or implemented by one or more VHDL or several software modules being executed on at least one hardware device. The hardware device can be any kind of device which can be programmed including, for example, any kind of a computer, e.g., a server, a personal computer, or the like, or any combination thereof, for example, one processor and two field-programmable gate arrays (FPGAs). The device may also include means which could be, for example, hardware means like an application-specific integrated circuit (ASIC) or a combination of hardware and software means, an ASIC and an FPGA, or at least one microprocessor and at least one memory with software modules located therein. Thus, the means are at least one hardware means or at least one hardware-plus-software means. The method according to various embodiments described herein may be implemented in pure hardware or partly in hardware and partly in software. Alternatively, the embodiment may be implemented on different hardware devices, for example, using a plurality of central processing units (CPUs).

While the present disclosure has been shown and described with reference to various embodiments thereof, it will be understood by those skilled in the art that various changes in form and details may be made therein without departing from the spirit and scope of the present disclosure as defined by the appended claims their equivalents.

What is claimed is:

1. A method of launching an application in an electronic device, the method comprising:
displaying, on a display of the electronic device, an application icon corresponding to the application;
receiving, via an input/output (I/O) interface of the electronic device, a first user input associated with the application icon;
in response to receiving the first user input based on the application icon being displayed at a first size:
displaying, on the display, the application icon at a second size, different from the first size, and
displaying, on the display, a first user interface (UI) element such that the first UI element overlaps the application icon displayed at the second size;
in response to receiving a second user input associated with the application icon based on the application icon being displayed at the second size and the first UI element being displayed to overlap the application icon:
displaying, on the display, the application icon at a third size, different from the second size, and
displaying, on the display, the first UI element and a second UI element such that the first UI element and the second UI element overlap the application icon displayed at the third size;
receiving, via the I/O interface, a third user input, which is different from the first user input, on one of the first UI element or the second UI element based on the application icon being displayed at the third size;
launching, by at least one processor of the electronic device, a functionality of the application corresponding to the first UI element or second UI element on which the third user input is received;
in response to receiving a fourth input corresponding to the first UI element and the second UI element:
forming a group of functionalities including the functionality associated with the first UI element and the functionality associated with the second UI element, and
displaying, on the display, a third UI element that corresponds to the group of functionalities;

determining that a fifth input corresponding to the third UI element indicates a request to remove at least one of the functionality associated with the first UI element or the functionality associated with the second UI element; and in response to receiving a sixth input on the first UI element or the second UI element, removing at least one of the functionality associated with the first UI element or at least one of the functionality associated with the second UI element from the group of functionalities associated with the third UI element, wherein the first UI element and the second UI element correspond to different functionalities provided by the application.

2. The method as claimed in claim 1, further comprising:
displaying additional UI elements corresponding to functionalities associated with a plurality of different applications in response to receiving a seventh user input when the at least one of the first UI element or the second UI element is displayed.

3. The method as claimed in claim 1,
wherein the first user input corresponds to a pre-configured gesture, and
wherein the pre-configured gesture is a zoom gesture.

4. The method as claimed in claim 1, further comprising:
in response to receiving a seventh input corresponding to the third UI element, launching the functionality associated with the first UI element and the functionality associated with the second UI element in separate tabs.

5. The method as claimed in claim 1,
wherein at least one of the first user input or the second user input is a zoom input, and
wherein the third user input is a touch input.

6. The method as claimed in claim 1,
wherein, in response to receiving the first user input, the displaying of the first UI element comprises displaying a first plurality of UI elements, and
wherein, in response to receiving the second user input, the displaying of the first UI element and the second UI element comprises displaying a second plurality of UI element greater than the first plurality of UI elements.

7. An electronic device comprising:
at least one processor; and
a non-volatile memory comprising instructions, the instructions configured to cause the at least one processor to control to:
display, on a display of the electronic device, an application icon corresponding to an application,
receive, via an input/output (I/O) interface of the electronic device, a first user input associated with the application icon,
in response to receiving the first user input based on the application icon being displayed at a first size:
display, on the display, the application icon at a second size, different from the first size, and
display, on the display, a first user interface (UI) element such that the first UI element overlaps the application icon displayed at the second size,
in response to receiving a second user input associated with the application icon based on the application icon being displayed at the second size and the first UI element is displayed to overlap the application icon:
display, on the display, the application icon at a third size, different from a second size, and
display, on the display, the first UI element and a second UI element such that the first UI element and the second UI element overlap the application icon displayed at the third size,
receive, via the I/O interface, a third user input, which is different from the first user input, on one of the first UI element or the second UI element based on the application icon being displayed at the third size,
launch a functionality of the application corresponding to the first UI element or the second UI element on which the third user input is received,
in response to receiving a fourth input corresponding to the first UI element and the second UI element:
form a group of functionalities including the functionality associated with the first UI element and the functionality associated with the second UI element, and
display, on the display, a third UI element that corresponds to the group of functionalities;
determine that a fifth input corresponding to the third UI element indicates a request to remove at least one of the functionality associated with the first UI element or the functionality associated with the second UI element; and
in response to receiving a sixth input on the first UI element or the second UI element, remove at least one of the functionality associated with the first UI element or at least one of the functionality associated with the second UI element from the group of functionalities associated with the third UI element,
wherein the first UI element and the second UI element correspond to different functionalities provided by the application.

8. The electronic device as claimed in claim 7, wherein the instructions are further configured to cause the at least one processor to control to display additional UI elements corresponding to functionalities associated with a plurality of different applications in response to receiving a fourth seventh user input when the at least one of the first UI element or the second UI element is displayed.

9. The electronic device as claimed in claim 7, wherein the instructions are further configured to cause the at least one processor to control to: in response to receiving a fifth seventh input corresponding to the third UI element, launch the functionality associated with the first UI element and the functionality associated with the second UI element in separate tabs.

10. The electronic device as claimed in claim 7,
wherein at least one of the first user input or the second user input is a zoom input, and
wherein the third user input is a touch input.

11. The electronic device as claimed in claim 7,
wherein, to display the first UI element in response to receiving the first user input, the instructions are further configured to cause the at least one processor to control to display a first plurality of UI elements, and
wherein, to display the first UI element and the second UI element in response to receiving the second user input, the instructions are further configured to cause the at least one processor to control to display a second plurality of UI elements greater than the first plurality of UI elements.

* * * * *